United States Patent
Loomis et al.

(10) Patent No.: US 11,500,702 B1
(45) Date of Patent: Nov. 15, 2022

(54) SYSTEM AND METHOD FOR TIMED DATA TRANSMISSION

(71) Applicant: Visa International Service Association, San Francisco, CA (US)

(72) Inventors: Gregory Loomis, Fremont, CA (US); Shantnu Singh, Belmont, CA (US); Manikandan Radhakrishnan, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/240,793

(22) Filed: Apr. 26, 2021

(51) Int. Cl.
  *G06F 3/00* (2006.01)
  *G06F 9/54* (2006.01)
  *G06F 9/38* (2018.01)
  *G06F 9/48* (2006.01)

(52) U.S. Cl.
  CPC ............ *G06F 9/546* (2013.01); *G06F 9/3836* (2013.01); *G06F 9/4881* (2013.01)

(58) Field of Classification Search
  CPC ....................................................... G06F 9/541
  See application file for complete search history.

(56) References Cited

U.S. PATENT DOCUMENTS

| 6,123,737 | A | 9/2000 | Sadowsky | |
|---|---|---|---|---|
| 6,351,761 | B1 * | 2/2002 | Cantone ................. | G06F 16/958 709/219 |
| 9,148,308 | B2 * | 9/2015 | Qiu ........................ | H04L 12/66 |
| 2006/0248522 | A1 | 11/2006 | Lakshminarayanan et al. | |
| 2007/0005366 | A1 * | 1/2007 | Sravanapudi ....... | H04L 67/2842 704/270.1 |
| 2012/0066124 | A1 | 3/2012 | Modi | |
| 2013/0110935 | A1 * | 5/2013 | Hwang ................... | H04L 29/06 709/204 |
| 2014/0214675 | A1 | 7/2014 | Sharma et al. | |
| 2018/0107996 | A1 | 4/2018 | Pareek et al. | |
| 2019/0311355 | A1 * | 10/2019 | Kulkarni .............. | G06Q 20/382 |

(Continued)

FOREIGN PATENT DOCUMENTS

| CN | 103716397 | A | * | 4/2014 |
|---|---|---|---|---|
| CN | 105791399 | B | * | 2/2018 |
| WO | WO 2019068129 | A1 | | 4/2019 |

OTHER PUBLICATIONS

U' lfar Erlingsson, XFI: Software Guards for System Address Spaces. (Year: 2006).*

(Continued)

*Primary Examiner* — Lechi Truong
(74) *Attorney, Agent, or Firm* — Kilpatrick Townsend & Stockton LLP

(57) ABSTRACT

A method is disclosed. The method comprising receiving, by a processor computer from a coordination computer, a push transfer instruction message comprising a recipient address associated with a recipient, a data item, and a time period for transferring the data item to a recipient account associated with the recipient address. The method also includes storing, by the processor computer, the push transfer instruction message. After the time period, the push transfer instruction message comprising the data item is transmitted to a recipient authorizing entity computer associated with the recipient address to transfer the data item.

20 Claims, 5 Drawing Sheets

(56) References Cited

U.S. PATENT DOCUMENTS

2021/0067598 A1* 3/2021 Bhat .................. H04L 67/2804

OTHER PUBLICATIONS

Binbin Yong, Intelligent monitor system based on cloud and convolutional neural networks. (Year: 2017).*
Camarda, "Real-Time Push Payments: A Future Payment Technology | American Express", publication date before Apr. 26, 2021, 8 pages.

* cited by examiner

SYSTEM AND METHOD FOR TIMED DATA TRANSMISSION

CROSS-REFERENCES TO RELATED APPLICATIONS

None.

BACKGROUND

The rapid transmission of data items in a computer network can be problematic in some instances. For example, in some cases, too many transaction messages may be transmitted to one end point around the same time, thereby causing that end point to experience processing problems. In addition, sometimes, the end point that is intended to receive data may not be ready to process it. For example, a particular data item such as a data packet or a transaction amount may be received at an end point computer, but the end point computer is not yet able to process it for some reason (e.g., the software in the end point is not up to date, or an account at the end point has not yet been set up). This can also cause a sender device that initiates a data item transfer to resubmit it at a later time.

Embodiments of the disclosure address this problem and other problems individually and collectively.

SUMMARY

One embodiment of the invention includes a method. The method comprises: receiving, by a processor computer from a coordination computer, a push transfer instruction message comprising a recipient address associated with a recipient, a data item, and a time period for transferring the data item to a recipient account associated with the recipient address; storing, by the processor computer, the push transfer instruction message; and after the time period, transmitting the push transfer instruction message comprising the data item to a recipient authorizing entity computer associated with the recipient address to transfer the data item to the recipient account.

Another embodiment includes a processor computer comprising: a processor; and a computer readable medium comprising instructions which cause the processor computer to: receive, from a coordination computer, a push transfer instruction message comprising a sender address associated with a sender, a recipient address associated with a recipient, a data item, and a time period for transferring the data item to a recipient account associated with the recipient address; store the push transfer instruction message; and after the time period, transmit the push transfer instruction message comprising the data item to a recipient authorizing entity computer associated with the recipient address to transfer the data item to the recipient account.

A better understanding of the nature and advantages of embodiments of the invention may be gained with reference to the following detailed description and accompanying drawings.

DETAILED DESCRIPTION

Figure 1:
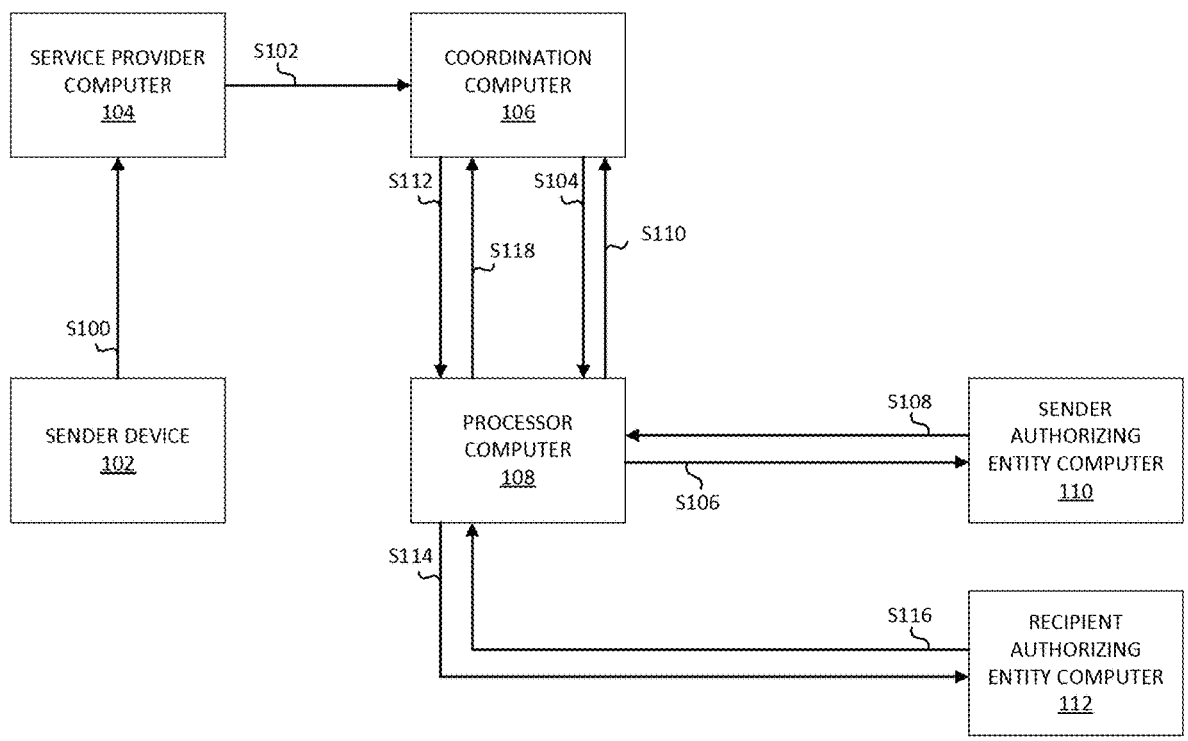
FIG. 1 shows a block diagram of a system with a flow diagram according to an embodiment.

Prior to discussing embodiments of the disclosure, some terms can be described in further detail.

A "user" may include an individual or a computational device. In some embodiments, a user may be associated with one or more personal accounts and/or mobile devices. In some embodiments, the user may be a sender, or a recipient.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "server computer" is typically a powerful computer or cluster of computers. For example, the server computer can be a large mainframe, a minicomputer cluster, or a group of servers functioning as a unit. In one example, the server computer may be a database server coupled to a web server. The server computer may also be a cloud based computer.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

An "service provider" may be an entity that provides services to users registered with the service. In some embodiments, a service provider may provide data or money transfer services for users.

FIG. 1 shows a block diagram of a system 100 with a flow diagram according to an embodiment. The system 100 of FIG. 1 can include a sender (not shown) operating a sender device 102. The sender device 102 may be an example of a user device. The sender device 102 may be in communication with a service provider computer 104 operated by a service provider.

The service provider that operates the service provider computer 104 could be an entity that provides transfer services such as data transfer services or money transfer services. The sender device 102 may have an application that is associated with the service provider. For example, in some embodiments, the application may be a data transfer application that is present on the sender's device 102.

The service provider computer 104 may be in communication with a coordination computer 106, which is affiliated with the service provider computer 104. In some embodiments, the coordination computer 106 may facilitate transfer requests received from the service provider computer 104. For example, in some embodiments, the coordination computer 106 may be operated by a bank that handles accounts on behalf of the service provider operating the service provider computer 104. In other embodiments, the coordination computer 106 may be a hub that services a central point for distributing data between computers in a network.

The coordination computer 106 may be in communication with a processor computer 108. The processing computer 108 may have a hub, which routes communications between different authorizing entity computers such as the sender authorizing entity computer 110 and the recipient authorizing entity computer 112. The processing computer 108 may include a directory which maps different account identifiers or portions thereof to different authorizing entity computers. In some embodiments, the sender authorizing entity computer 110 and the recipient authorizing entity computer 112 may issue accounts for a sender and a recipient of a data item, respectively.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

Methods according to embodiments of the invention can be described with reference to FIG. 1. A method can be described with reference to a money transfer transaction between a sender of funds and a recipient of funds. However, embodiments of the invention are not limited to money transfer transactions.

In step S100, the sender operating the sender device 102 may create a transfer request message to be sent to the service provider computer 104. The sender may use an application that is present on the sender device 102. The service provider computer 104 can be an application server computer associated with the service provider application on the sender device 102. In some embodiments, the transfer request message may comprise an identifier associated with the sender (e.g., a name, an e-mail address, and/or a phone number, etc.), an identifier associated with the recipient (e.g., a name, an e-mail address, and/or a phone number, etc.), a data item (e.g., an amount of funds to be transferred from an account associated with the sender to an account associated with the recipient), and a time period (e.g., provided in a format such as YYYY-MM-DD-hh:mm:ss, YYYY-MM-DD, MM-DD-YYYY, etc.) after which the data item will be transferred.

In step S102, after receiving the transfer request message, the service provider computer 104 may retrieve, from a database, a sender address (e.g., an account number associated with the sender) and a recipient address (e.g., an account number associated with the recipient).

In some embodiments, the service provider computer 104 may receive the sender address during a sender registration process with the service provider operating the service provider computer 104. The service provider computer 104 may have also received the recipient address during a recipient registration process with the service provider operating the service provider computer 104. In other embodiments, the service provider computer 104 may contact the recipient using the identifier provided by the sender in step S100 to request the recipient address from the recipient. The service provider computer 104 may then transmit the transfer request message comprising the sender address, the recipient address, the data item, and the time period to the coordination computer 106.

In step S104, after receiving the transfer request message from the service provider computer 104, the coordination computer 106 may generate a pull transfer instruction message. The pull transfer instruction message may comprise the sender address (e.g., a sender account number), an address (e.g., a coordination computer account number for holding funds from the sender) associated with the coordination computer 106, and an indication of the data item (e.g., an amount to eventually be transferred from the sender to the recipient) to be transferred. After generating the pull transfer instruction message, the coordination computer 106 may then transmit the pull transfer instruction message to the processor computer 108.

In some embodiments, the pull transfer instruction message may be an account funding transaction (AFT) message. An AFT (Account Funding Transaction) is a transaction that can supply funds to another account such as a credit, prepaid, debit, ATM or on-line account. An AFT indicator can be used in both the authorization and clearing and settlement transactions. Neither the authorization nor the clearing transaction carries any financial information about the recipient of a money transfer. In some embodiments, the AFT message carries only the account number associated with the payment card of the sender. An AFT message can also be accompanied by indicators, which allow the sender's card issuing bank to make appropriate authorization decisions. Indicators include channel information such as Mail Order/Telephone Order or Internet, and merchant type. The following data fields can be used in an AFT and can be supported in messages and clearing and settlement transactions. The data fields can include: Processing Code; Merchant Type; CAVV Result Code; Mail Order/Telephone Order/Electronic Commerce Indicator; Mail/Phone/Electronic Commerce Indicator; Transaction ID (XID); and TransStain/CAVV Data.

In step S106, after receiving the pull transfer instruction message from the coordination computer 106, the processor computer 108 may analyze the sender address and can determine the sender authorizing entity computer 110. For example, the sender address can be a sixteen digit primary account number, and the first six digits of the primary account number can identify the sender authorizing entity computer 110. After identifying the sender authorizing entity computer 110 and its network address, the processor computer 108 can route the pull transfer instruction message to the sender authorizing entity computer 110.

After receiving the pull transfer instruction message, the sender authorizing entity computer 110 may parse the pull transfer instruction message and may determine the data item associated with the pull transfer instruction message. The sender authorizing entity computer 110 can then analyze the data item and then determine if the account associated with the sender address (e.g., the sender account number) should be debited. If there are sufficient funds in the account and if there is no fraud associated with the request, then the account of the sender is debited.

In step S108, after processing the pull transfer instruction message, the sender authorizing entity computer 110 may then generate a pull transfer response message and send the same to the processor computer 106. In some embodiments, such as when the pull transfer instruction message is an account funding transaction message, the response corresponds to the transfer (e.g., pay) the data item (e.g., the amount of funds) to the coordination computer 106, so that the data item can be sent to another entity (e.g., the recipient) at a later time.

In step S110, after receiving the pull transfer response message, the processor computer 108 may notify (e.g., by e-mail, an API communication, etc.) the sender device 102, the service provider computer 104, and/or the coordination computer 106 of the authorization of the pull transfer request message. Once notified, the coordination computer 106 may now make use of the funds (e.g., the data item), as the processor computer 108 provides a guarantee that the data item will be transferred from the sender authorizing entity computer 110, potentially at a later time. This guarantee allows for the coordination computer 106 to make use of the data item in real time, even if the data item itself has not been transferred. In some embodiments, the data item is transferred from the sender authorizing entity computer 110 to the coordination computer 106 after a settlement process performed by the processor computer 108.

In step S112, after receiving the notification of the authorized pull transfer from the processor computer 108, the coordination computer 106 may generate a push transfer instruction message comprising the sender address, the recipient address, the data item, and the time period. The coordination computer 106 may then transmit the push transfer instruction message to the processor computer 108.

In some embodiments, the push transfer instruction message may be an OCT (Original Credit Transaction) message. An OCT (Original Credit Transaction) can be a clearing and settlement credit transaction designed for use in business applications such as a business money transfer or business-to-consumer repayments.

The OCT can be a transaction used to deliver funds to the recipient account. It is separate from, and can take place after, an AFT transaction. This timing is to ensure that payment funds are secured before funds are sent to the recipient.

The amount of the OCT can be the amount agreed by the sender and the service provider in the currency agreed. In some embodiments, the OCT carries only the account number of the recipient and no information about the sender. A special indicator identifies an OCT to the recipient's issuer bank. Settlement can take place after a period of time.

Transaction data present on an original OCT can be transcribed unchanged onto related exception transactions including chargebacks and reversals. Establishing the ability to link the delivery of funds transactions to the funding transaction is also useful. OCTs originating from clearing and settlement connected acquirers can be identified by a pre-determined Transaction Code Qualifier value. No authorizations will be processed for OCTs originating from clearing and settlement connected end points. An Electronic Commerce Indicator (ECI) can be included on all Internet OCTs, and any money transfer portal can use a specific Merchant Category Code (MCC) to indicate Financial Institutions-Merchandise and Services for both the AFT and OCT transactions.

In step S114, after receiving the push transfer instruction message, the processor computer 108 may store the push transfer instruction message or the data elements therein in memory or in a database. The processor computer 108 may store the push transfer instruction message until the time period included in the message. The time period may be any suitable time period including one half, one, two, or three days. After the time period has elapsed, the push transfer instruction message may be transmitted to the recipient authorizing entity computer 112. The processor computer 108 comprises a clock or a timer which may be used to facilitate timely transmission of the push transfer instruction message.

At any point before the time period for sending the push transfer instruction message, the processor computer 108 may receive a transfer status query message from the coordination computer 106 on the status of the push transfer. The coordination computer 106 may include an indication of a push transfer instruction message (e.g., a unique identifier included in the push transfer instruction message) to identify the specific push transaction. The processor computer 108 may then transmit a message comprising the status of the push transfer to the coordination computer 106.

In some embodiments, the processor computer 108 may additionally receive a push transfer update message comprising instructions to update the store push transfer instruction message. For example, if the push transfer instruction message is to be sent in two days instead of one day as originally contemplated, then the timer or clock in the processor computer 108 can be adjusted. In some embodiments, the update associated with the push transfer update message may be an instruction to cancel the transfer or to change the data item to be transferred. For example, if the sender of the sender device 102 originally intended to transfer one hundred dollars to the receiver of a receiver device, and then wanted to update that amount to fifty dollars, then the processor computer 108 could update its systems to accommodate for the transfer of the new amount. The query or update may have been originated by the sender operating the sender device 102, or the coordination computer 106. After the update is complete, the processor computer 108 may send a transfer update message to the coordination computer 106 to confirm success of the update.

In step S116, responsive to receiving the push transfer instruction message, the recipient authorizing entity computer 112 may analyze the push transfer instruction message. The recipient authorizing entity computer 112 can analyze the data item in the push transfer instruction message, and may then credit an account of the recipient that is held at the recipient authorizing entity computer 112.

In step S116, after crediting the account of the receiver, the recipient authorizing entity computer 112 can generate a push transfer response message. The push transfer response message may comprise an acceptance of the transfer of the data item. In some embodiments, the data item may not be immediately transferred in this step, but at a later time. In some embodiments, the data item may be used in real time under a guarantee by the processor computer 108 that the data item will be transferred.

In step S118, after receiving the push transfer response message, the processor computer 108 may transmit the push transfer response message to the coordination computer 106. At a later time, actual funds may be transferred from the coordination computer to the recipient authorizing entity computer 112 in a settlement process.

Figure 2:
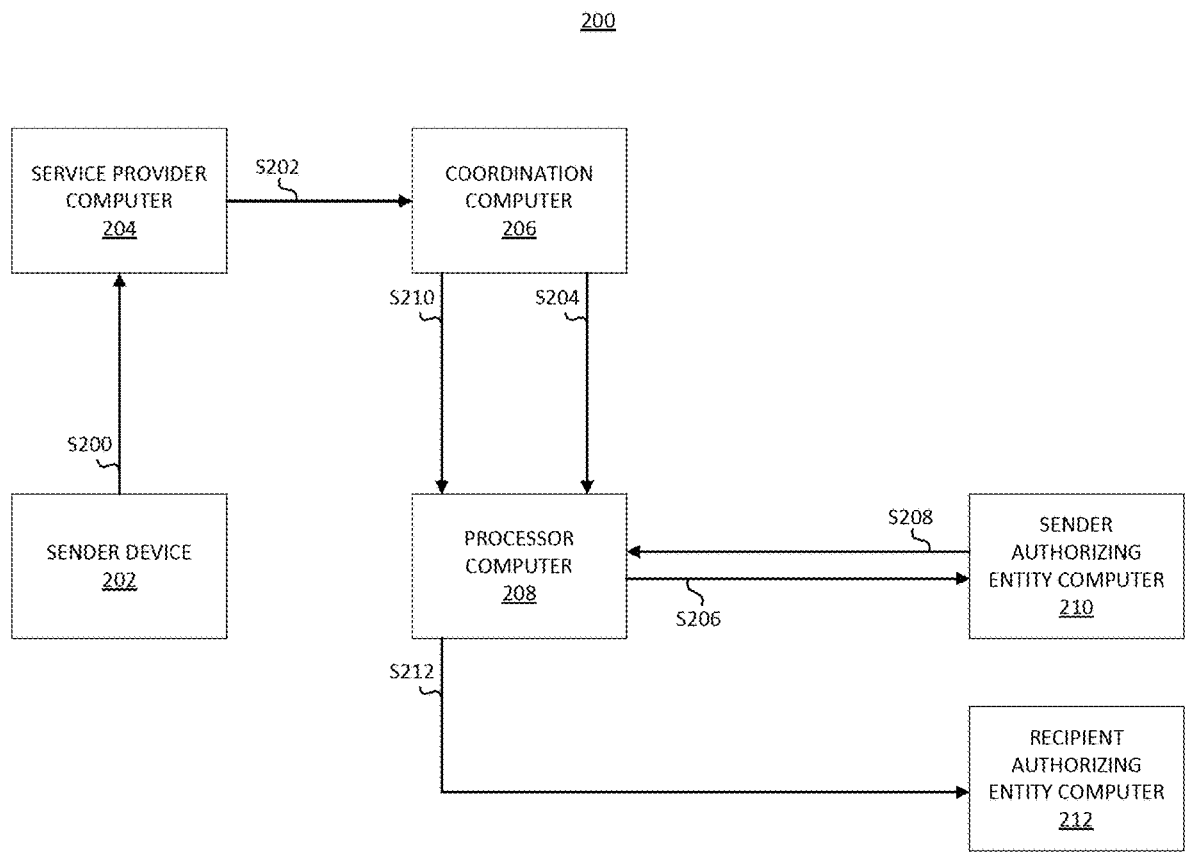
FIG. 2 shows a block diagram of another system with another flow diagram according to another embodiment.

FIG. 2 shows a block diagram of another system with another flow diagram according to another embodiment. The embodiments in FIG. 2 relate to the transfer of data, and do not relate to payment processing.

The system 200 of FIG. 2 can include a sender (not shown) operating a sender device 202. In some embodiments, the sender may provide a data item to a recipient operating or associated with a recipient authorizing entity computer 212. In some embodiments, the data item may comprise a software update. In other embodiments, the data item may comprise a data file in a format such as CSV, XML, TXT, PDF, MP3, etc. The sender device 202 may be in communication with (e.g., through an application installed on the sender device 202 or accessed via a web page, etc.) a service provider computer 204 operated by a service provider. The service provider computer 204 may be in communication with a coordination computer 206. The coordination computer 206 may a facilitate transfer request received from the service provider computer 204. The coordination computer 206 may be in communication with a processor computer 208 which routes the transfer request to a sender authorizing entity computer 210 operated by a sender authorizing entity associated with the sender and the recipient authorizing entity computer 212 operated by a recipient authorizing entity associated with the recipient. The functions of the computers in FIG. 2 can be similar to or different than the computers with the corresponding names in FIG. 1.

In step S200, the sender operating the sender device 202 may create a transfer request message to be sent to the service provider computer 204. In some embodiments, the transfer request message may comprise an identifier associated with the sender (e.g., a name, an email address, etc.), an identifier associated with the recipient, a data item (e.g., an amount of funds to be transferred from an account associated with the sender to an account associated with the recipient), and a time period (e.g., provided in a format such as YYYY-MM-DD-hh:mm:ss) after which the data item will be transferred.

In step S202, after receiving the transfer request message, the service provider computer 204 may retrieve, from a database, a sender address and a recipient address. In some embodiments, the sender and recipient address may be IP addresses associated with the sender and recipient, respectively. In other embodiments, the sender and recipient address may be any other identifier which allows the sender and recipient to be identified. In some embodiments, the service provider computer 204 may receive the sender address and store it in a database during registration with the service. The recipient address may be received during a similar registration process, or the service provider computer 204 may contact the recipient using the recipient identifier provided by the sender in step S200 to query for the recipient address. The service provider computer 204 may then transmit the transfer request message comprising the sender address, the recipient address, the data item, and the time period to the coordination computer 206.

In step 204, after receiving the transfer request message from the service provider computer 204, the coordination computer 206 may generate a pull transfer instruction message comprising the sender address, the recipient address, and an indication of the data item to be transferred. The coordination computer 206 may the transmit the pull transfer instruction message to the processor computer 208.

In step S206, after receiving the transfer request message from the coordination computer, the processor computer 208 may retrieve the sender address from the pull transfer instruction message to route the pull transfer instruction message to the sender authorizing entity computer 210.

In step S208, the sender authorizing entity computer 110 may receive the pull transfer instruction message and retrieve the data item from a database associated with the sender address. The sender authorizing entity computer 210 may then generate a pull transfer response message. The sender authorizing entity computer 210 may choose to approve or deny the transfer. This can be done after any suitable verification steps, such as verifying the data item is contained in the database, are met. In some embodiments, the response transfers a data item (e.g., a software update, a data file, etc.) to the coordination computer 206 so that the data item can be sent to another party (e.g., the recipient) at a later time. The sender authorizing entity computer 210 may then transmit the pull transfer response message to the processor computer 208 wherein the data item may then be stored in memory or in a database.

In step S210, any time after transmitting the pull transfer request message, the coordination computer 206 may generate a push transfer instruction message comprising the sender address, the recipient address, the indication of the data item, and the time period. The coordination computer may then transmit the push transfer instruction message to the processor computer 208.

In step S212, after receiving the pull transfer response message from the sender authorizing entity computer 210 and the push transfer instruction message from the coordination computer 206, the processor computer 208 may access the database storing the data item. If the data item is found to be stored in the database (e.g., the pull transfer response message was received), the processor computer 208 may then retrieve the time period from the push transfer instruction message. The processor computer 208 may then determine whether or not to continuing storing the data item or transmit the push transfer instruction message to the recipient authorizing entity computer 212. The decision as to whether to send the push transfer instruction message may depend upon the time period. In some embodiments, the processor computer 208 may first process (e.g., reformat) the data item included in the push transfer instruction message before transmission.

At any point before the time period and after receiving the pull transfer response message, the processor computer 208 may receive a transfer status query message from the coordination computer 206 on the status of the push transfer. The coordination computer 206 may include an indication of a push transfer instruction message (e.g., a unique identifier included in the push transfer instruction message) to identify the particular push transfer. The processor computer 208 may transmit a message comprising the status of the push transfer. The processor computer 208 may additionally receive a push transfer update message comprising instructions to update the stored push transfer instruction message. In some embodiments, the update may be an instruction to cancel the transfer or to change the data item to be transferred.

The query or update may have been originated by the sender operating the sender device 202, or the coordination computer 206. After the update is complete, the processor computer 208 may send a transfer update message to the coordination computer 206 to confirm success of the update.

Figure 3:
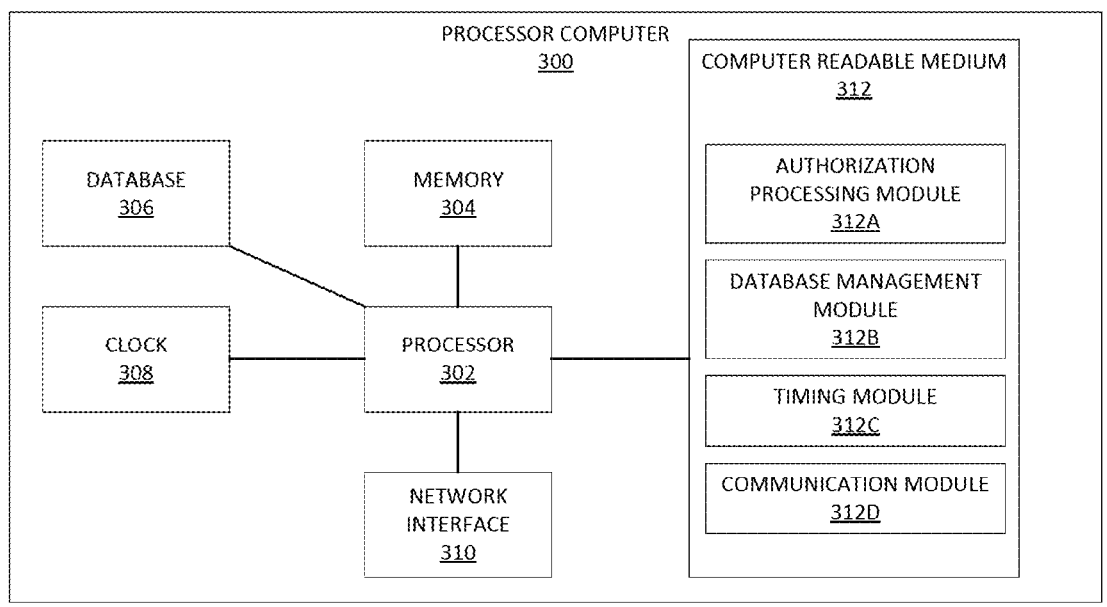
FIG. 3 shows a block diagram of a processor computer according to an embodiment.

FIG. 3 shows a block diagram of a processor computer 300 according to an embodiment. In some embodiments, the processor computer 300 may be operated by a payment processing network to facilitate payments between two or more parties. In other embodiments, the processor computer 300 may be operated by a party to facilitate the transfer of data items such as software updates or any other data files. The processor computer 300 may comprise a processor 302. The processor 302 may be coupled to a memory 304, a database 306, a clock 308, a network interface 310, and a computer readable medium 312. The computer readable medium 312 can comprise any suitable number and types of software modules.

The memory 304 can be used to store data and code. In some embodiments, the messages and data received (e.g., the push transfer instruction message of the systems and processes FIG. 1 and FIG. 2, etc.) may be stored in the memory 304. In other embodiments, the messages and data received may be stored in the database 306. The memory 304 and/or database 306 may be coupled to the processor 302 internally or externally (e.g., cloud based data storage), and may comprise any combination of volatile and/or non-volatile memory, such as RAM, DRAM, ROM, flash, or any other suitable memory device.

The memory 304 may also store timing data associated with timers. The memory 304 may also store a table linked to different timer values input by various sending entities or service providers. For example, the memory 304 may store certain addresses (e.g., account numbers, IP addresses, etc.) and the timer values associated with them. In one example, one set of timer values (e.g., one day) may be associated with one set of addresses (e.g., a range or set of account numbers), while another set of timer values (e.g., two days) may be associated with another set of addresses (e.g., another range or set of account numbers).

The clock 308 may be used to keep track of time (either relative or absolute), and can work in conjunction with a timing module 312C to time the transmission of data item.

The network interface 310 may include an interface that can allow the processor computer 300 to communicate with external computers. The network interface 310 may enable the processor computer 300 to communicate data to and from another device such as the previously described coordination computer, the sender authorizing entity computer, and the recipient authorizing entity computer. Some examples of the network interface 310 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 310 may include Wi-Fi™. Data transferred via the network interface 310 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 310 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 312 may comprise code, executable by the processor 310, for a method comprising: receiving, by a processor computer from a coordination computer, a push transfer instruction message comprising a recipient address associated with a recipient, a data item, and a time period for transferring the data item to a recipient account associated with the recipient address; storing, by the processor computer, the push transfer instruction message; and after the time period, transmitting the push transfer instruction message comprising the data item to a recipient authorizing entity computer associated with the recipient address to transfer the data item to the recipient account.

The computer readable medium 312 may comprise a number of software modules including, but not limited to, an authorization processing module 312A, a database management module 312B, a timing module 312C, and a communication module 312D.

The authorization processing module 312A may comprise code that causes the processor 302 to evaluate transfer instruction messages for transfer and determine if the transfers should be authorized. The authorization processing module 312A may also include code for routing or modifying transfer instruction and response messages as they pass between various parties such as the coordination computer and the sender and recipient authorizing entity computers.

The database management module 312B may comprise code that causes the processor 302 to store and process (e.g., reformat) the transfer instruction and response messages. For example, upon receiving a push/pull transfer instruction/response message, the database management module 312 may store the message in the memory 304 or database 306. In some embodiments, such as that of FIG. 2, the data item (e.g., a data file) may be reformatted before storing.

The timing module 312C may comprise code that causes the processor 302 to transmit push transfers stored by the database management module 312B. The timing module 312C may access the time period stored in a push transfer instruction message and compare it against the current time. The timing module 312C may generate a proceed or wait command to transmit the data item to the recipient. In some embodiments, the timing module 312C may be linked with the clock 308.

The communication module 312D may comprise code that causes the processor 302 to generate messages, forward messages, receive messages, reformat messages, and/or otherwise communicate with other entities.

Figure 4:
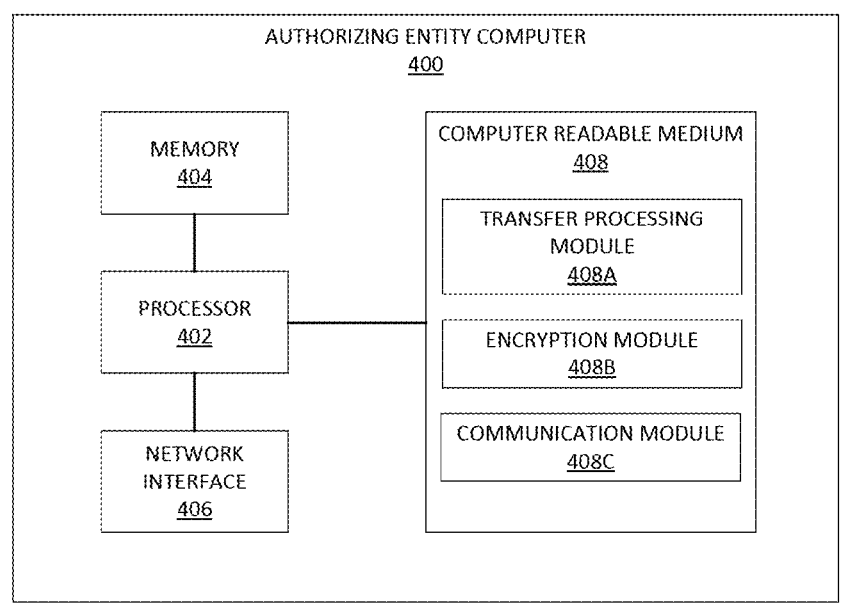
FIG. 4 shows a block diagram of an authorizing entity computer according to an embodiment.

FIG. 4 shows a block diagram of an authorizing entity computer 400 according to an embodiment. The previously described sender authorizing entity computer and the recipient authorizing entity computer can take the form of the authorizing entity computer 400 in FIG. 4. In this regard, the authorizing entity computer 400 may be operated by a sender authorizing entity or a recipient authorizing entity. In some embodiments, such as that of FIG. 1, an authorizing entity computer 400 may issue and maintain accounts for senders and recipients. In other embodiments, such as that of FIG. 2, the authorizing entity computer 400 may be operated by the sender and recipients themselves. The authorizing entity computer 400 may comprise a processor 402. The processor 402 may be coupled to a memory 404, a network interface 406, and a computer readable medium 408. The computer readable medium 408 can comprise any suitable number and types of software modules.

The memory 404 can be used to store data and code. The memory 404 may store data items. In some embodiments, the memory 404 may store an account and related information about the account, such as an amount of funds contained in the account. In other embodiments, the memory 404 may store data items such as software. The memory 404 may be coupled to the processor 402 internally or externally (e.g., cloud based data storage), and may comprise any combination of volatile and/or non-volatile memory, such as RAM, DRAM, ROM, flash, or any other suitable memory device.

The network interface 410 may include an interface that can allow the processor computer 400 to communicate with external computers. The network interface 410 may have the same features or different features as the previously described network interface 310.

The computer readable medium 408 may comprise a number of software modules including, but not limited to, a transaction processing module 408A, an encryption module 408B, and a communication module 408C.

The transfer processing module 408A may comprise code to evaluate and execute transfers. The transfer processing module 408A may receive a transfer instruction message and determine if the transfer should proceed. A number of checks (e.g., fraud checks), such as determining if the data item indicated in a pull transfer instruction message, can be stored in the memory 404, and may be executed by the transfer processing module 408A to determine if the transfer should proceed.

The encryption module 408B may include any suitable encryption/decryption algorithms to encrypt data in embodiments of the invention. Suitable encryption algorithms may include DES, triple DES, AES, etc. It may also store encryption keys that can be used with such encryption algorithms. The encryption module 408B may utilize symmetric or asymmetric encryption techniques to encrypt and/or verify data. In some embodiments, the encryption module 408B the data items stored in the memory 404 may be in encrypted form and may be decrypted before being transmitted to another computer.

The communication module 408C may comprise code that causes the processor 402 to generate messages, forward messages, receive messages, reformat messages, and/or otherwise communicate with other entities.

Figure 5:
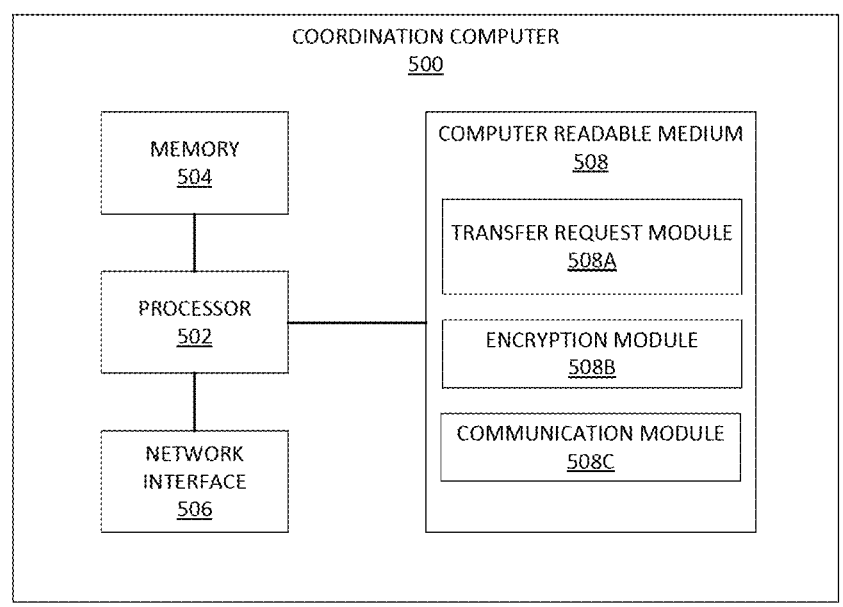
FIG. 5 shows a block diagram of a coordination computer according to an embodiment.

FIG. 5 shows a block diagram of a coordination computer 500 according to an embodiment. The coordination computer 500 may be operated by a first authorizing entity associated with a service provider. In some embodiments, the coordination computer 500 may facilitate transfers generated by a sender using the services provided by a service provider. The coordination computer 500 may comprise a processor 502. The processor 502 may be coupled to a memory 504, a network interface 506, and a computer readable medium 508. The computer readable medium 508 can comprise any suitable number and types of software modules.

The memory 504 can be used to store data and code. In some embodiments, the memory 504 may store transfer request messages received from a service provider computer. Additionally, in some embodiments, the memory 504 may store data items received from a processor computer as a result of a pull transfer instruction message. The memory 504 may be coupled to the processor 402 internally or externally (e.g., cloud based data storage), and may comprise any combination of volatile and/or non-volatile memory, such as RAM, DRAM, ROM, flash, or any other suitable memory device.

The network interface 510 may include an interface that can allow the processor computer 500 to communicate with external computers. The network interface 510 may have the same or different features as the network interface 310 and 410 described above.

The computer readable medium 508 may comprise a number of software modules including, but not limited to, a transfer request module 508A, an encryption module 508B, and a communication module 508C.

The transfer request module 508A may comprise code that causes the processor 502 to receive transfer request messages and generate transfer instruction messages. The transfer request module 508A may receive transfer request messages and generate corresponding pull and push instruction messages. For example, the transfer request module 508A may receive a transaction request message comprising a sender address, a recipient address, and an indication of a data item to be transferred and generate a pull transfer instruction message comprising the sender address and the indication of the data item. After the pull transfer is completed (e.g., the data item indicated is received by the coordination computer 500 or a processor computer), the transfer request module 508A may then generate a push transfer instruction message comprising the recipient address and the data item. In some embodiments, the transfer instruction message generated may comprise an AFT pull message or an OCT push message. In some embodiments, the transfer request module 508A may create queries directed to a processor computer to get updates on the status of a previously transmitted transfer instruction message.

The encryption module 508B may include any suitable encryption/decryption algorithms to encrypt data in embodiments of the invention. The encryption module 508B can have the same or different features as the previously described encryption module 408B.

The communication module 508C may comprise code that causes the processor 502 to generate messages, forward messages, receive messages, reformat messages, and/or otherwise communicate with other entities.

Embodiments of the invention have a number of advantages. In embodiments of the invention, the delivery of a particular data item can be timed according to various factors including network congestion, network load balancing, and expected recipient or sender delivery times. When a system has many hundreds of thousands of messages that are passing through it at any given time, it can be desirable to balance or distribute the transmission of data items over time to ensure that any single part of the network is overloaded.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a processor computer from a coordination computer, a push transfer instruction message comprising a recipient address associated with a recipient, a data item, and a time period for transferring the data item to a recipient account associated with the recipient address;
   storing, by the processor computer, the push transfer instruction message; and
   after the time period, transmitting the push transfer instruction message comprising the data item to a recipient authorizing entity computer associated with the recipient address to transfer the data item to the recipient account, wherein after storing the push transfer instruction message, the method further comprises:
   receiving, by the processor computer from the coordination computer, a transfer status query message associated with the push transfer instruction message;
   accessing, by the processor computer, a database storing push transfer instruction messages; and
   transmitting, by the processor computer to the coordination computer, a transfer status response message comprising a status of the push transfer instruction message.

2. The method of claim 1, wherein prior to receiving the push transfer instruction message, the method further comprises:
   receiving, by the processor computer from the coordination computer, a pull transfer instruction message comprising a sender address associated with a sender and an indication of the data item;
   transmitting, by the processor computer to a sender authorizing entity computer associated with the sender address, the pull transfer instruction message; and
   receiving, by the processor computer from a sender authorizing entity computer, a pull transfer response message comprising the data item.

3. The method of claim 1, wherein the processor computer comprises the database which stores the push transfer instruction message.

4. The method of claim 1, wherein the data item in the push transfer instruction message comprises a data file or a transfer amount.

5. A method comprising:
   receiving, by a processor computer from a coordination computer, a push transfer instruction message comprising a recipient address associated with a recipient, a data item, and a time period for transferring the data item to a recipient account associated with the recipient address;
   storing, by the processor computer, the push transfer instruction message; and
   after the time period, transmitting the push transfer instruction message comprising the data item to a recipient authorizing entity computer associated with the recipient address to transfer the data item to the recipient account, wherein after storing the push transfer instruction message, the method further comprises:
   receiving, by the processor computer from the coordination computer, a transfer update message comprising an indication associated with the push transfer instruction message;
   accessing, by the processor computer, a database storing push transfer instruction messages;
   updating, by the processor computer, the push transfer instruction message associated with the indication of the push transfer instruction message; and
   transmitting, by the processor computer to the coordination computer, an update response message.

6. The method of claim 1, wherein the data item comprises software update data.

7. The method of claim 1, wherein the coordination computer is in communication with a service provider computer that is in communication with a sender device operated by a sender.

8. A method comprising:
   receiving, by a processor computer from a coordination computer, a push transfer instruction message comprising a recipient address associated with a recipient, a data item, and a time period for transferring the data item to a recipient account associated with the recipient address;
   storing, by the processor computer, the push transfer instruction message; and after the time period, transmitting the push transfer instruction message comprising the data item to a recipient authorizing entity computer associated with the recipient address to transfer the data item to the recipient account, wherein prior to receiving the push transfer instruction message, the method further comprises:

receiving, by the processor computer from the coordination computer, a pull transfer instruction message comprising a sender address associated with a sender and an indication of the data item;

transmitting, by the processor computer to a sender authorizing entity computer associated with the sender address, the pull transfer instruction message;

receiving, by the processor computer from a sender authorizing entity computer, a pull transfer response message comprising the data item; and transmitting, by the processor computer to the coordination computer, the data item.

9. The method of claim 1, wherein the coordination computer is in communication with a service provider computer that operates an application on a sender device operated by a sender, the sender device being a mobile phone.

10. A processor computer comprising:
a processor; and
a computer readable medium comprising instructions which cause the processor computer to:
receive, from a coordination computer, a push transfer instruction message comprising a recipient address associated with a recipient, a data item, and a time period for transferring the data item to a recipient account associated with the recipient address;
store the push transfer instruction message; and
after the time period, transmit the push transfer instruction message comprising the data item to a recipient authorizing entity computer associated with the recipient address to transfer the data item to the recipient account, wherein the instructions further cause the processor to, after storing the push transfer instruction message:
receive, from the coordination computer, a transfer status query message associated with the push transfer instruction message;
access a database storing push transfer instruction messages; and
transmit, to the coordination computer, a transfer status response message comprising a status of the push transfer instruction message.

11. The processor computer of claim 10, wherein the computer readable medium further comprises instructions to:
receive, from the coordination computer, a pull transfer instruction message comprising a sender address associated with a sender and an indication of the data item;
transmit, to a sender authorizing entity computer associated with the sender address, the pull transfer instruction message; and
receive, from the sender authorizing entity computer, a pull transfer response message comprising the data item.

12. The processor computer of claim 10, wherein the push transfer instruction message comprises an OCT message.

13. The processor computer of claim 10, wherein the processor computer further comprises a database coupled to the processor, wherein the database stores the push transfer instruction message.

14. The processor computer of claim 10, wherein the computer readable medium further comprises a timing module.

15. The processor computer of claim 10, wherein the computer readable medium further comprises an authorization processing module.

16. A method comprising:
receiving, by a coordination computer from a service provider computer, a transaction request message comprising a sender address associated with a sender, a recipient address associated with a recipient, an indication of a data item, and a time period for transferring the data item to a recipient account associated with the recipient address;
generating, by the coordination computer, a push transfer instruction message comprising the recipient address, the data item, and the time period; and
transmitting, by the coordination computer to a processor computer, the push transfer instruction message,
wherein after receiving the transaction request message and prior to generating the push transfer instruction message, the method further comprises:
generating, by the coordination computer, a pull transfer instruction message comprising the sender address and the indication of the data item; and
transmitting, by the coordination computer to the processor computer, the pull transfer instruction message, and
wherein after transmitting the pull transfer instruction message and prior to generating the push transfer instruction message, the method further comprises:
receiving, by the coordination computer from the processor computer, the data item.

17. A processor computer comprising:
a processor; and
a non-transitory computer readable medium coupled to the processor, the non-transitory computer readable medium comprising code for causing the processor to perform operations comprising:
receiving, from a coordination computer, a push transfer instruction message comprising a recipient address associated with a recipient, a data item, and a time period for transferring the data item to a recipient account associated with the recipient address;
storing, by the processor computer, the push transfer instruction message; and
after the time period, transmitting the push transfer instruction message comprising the data item to a recipient authorizing entity computer associated with the recipient address to transfer the data item to the recipient account, wherein after storing the push transfer instruction message, wherein the operations further comprise:
receiving, from the coordination computer, a transfer status query message associated with the push transfer instruction message;
accessing a database storing push transfer instruction messages; and
transmitting, to the coordination computer, a transfer status response message comprising a status of the push transfer instruction message.

18. A processor computer comprising:
a processor; and
a non-transitory computer readable medium coupled to the processor, the non-transitory computer readable medium comprising code for causing the processor to perform operations comprising:

receiving, from a coordination computer, a push transfer instruction message comprising a recipient address associated with a recipient, a data item, and a time period for transferring the data item to a recipient account associated with the recipient address;

storing the push transfer instruction message; and after the time period, transmitting the push transfer instruction message comprising the data item to a recipient authorizing entity computer associated with the recipient address to transfer the data item to the recipient account, wherein after storing the push transfer instruction message, wherein the operations further comprise:

receiving, from the coordination computer, a transfer update message comprising an indication associated with the push transfer instruction message;

accessing a database storing push transfer instruction messages;

updating the push transfer instruction message associated with the indication of the push transfer instruction message; and transmitting, to the coordination computer, an update response message.

19. A processor computer comprising:

a processor; and a non-transitory computer readable medium coupled to the processor, the non-transitory computer readable medium comprising code for causing the processor to perform operations comprising:

receiving, from a coordination computer, a push transfer instruction message comprising a recipient address associated with a recipient, a data item, and a time period for transferring the data item to a recipient account associated with the recipient address;

storing the push transfer instruction message; and after the time period, transmitting the push transfer instruction message comprising the data item to a recipient authorizing entity computer associated with the recipient address to transfer the data item to the recipient account, wherein prior to receiving the push transfer instruction message, the operations further comprise:

receiving, from the coordination computer, a pull transfer instruction message comprising a sender address associated with a sender and an indication of the data item;

transmitting, to a sender authorizing entity computer associated with the sender address, the pull transfer instruction message;

receiving, from the sender authorizing entity computer, a pull transfer response message comprising the data item; and transmitting, to the coordination computer, the data item.

20. A coordination computer comprising:

a processor; and a non-transitory computer readable medium coupled to the processor, the non-transitory computer readable medium comprising code, executable by the processor, for performing operations comprising:

receiving, from a service provider computer, a transaction request message comprising a sender address associated with a sender, a recipient address associated with a recipient, an indication of a data item, and a time period for transferring the data item to a recipient account associated with the recipient address;

generating a push transfer instruction message comprising the recipient address, the data item, and the time period; and transmitting, to a processor computer, the push transfer instruction message, wherein after receiving the transaction request message and prior to generating the push transfer instruction message, wherein the operations further comprise:

generating, by the coordination computer, a pull transfer instruction message comprising the sender address and the indication of the data item; and transmitting, by the coordination computer to the processor computer, the pull transfer instruction message, and wherein after transmitting the pull transfer instruction message and prior to generating the push transfer instruction message, the operations further comprise:

receiving, from the processor computer, the data item.

* * * * *